United States Patent [19]
Smith

[11] Patent Number: 5,015,221
[45] Date of Patent: May 14, 1991

| [54] | DIFFERENTIAL STEERING MECHANISM |
|---|---|
| [76] | Inventor: Roger R. Smith, 7261 Lyons Rd., Imlay City, Mich. 48444 |
| [21] | Appl. No.: 539,943 |
| [22] | Filed: Jun. 18, 1990 |
| [51] | Int. Cl.$^5$ ............................................. F16H 1/44.5 |
| [52] | U.S. Cl. ........................................ 475/19; 180/6.7; 475/230 |
| [58] | Field of Search .................. 475/18, 19, 230, 231; 180/6.2, 6.7 |

[56] References Cited

U.S. PATENT DOCUMENTS

| 1,406,446 | 2/1922 | Custer | 475/18 |
| 1,421,834 | 7/1922 | Ross | 475/230 |
| 2,159,983 | 5/1939 | Colby | 180/6.2 X |
| 2,305,092 | 12/1942 | Lawrence | 475/231 X |
| 4,633,735 | 1/1987 | Sakurai et al. | 475/19 X |
| 4,738,161 | 4/1988 | Ivy | 180/6.7 X |
| 4,943,269 | 7/1990 | Smith | 475/231 |

Primary Examiner—Dwight Diehl
Attorney, Agent, or Firm—Peter A. Taucher; David L. Kuhn

[57] ABSTRACT

Disclosed is differential mechanism having two bearing rings. The mechanism is used for steering a vehicle by delivering a higher speed rotational power output to a tractive drive on one side of the vehicle than to another tractive drive on the opposite side of the vehicle.

8 Claims, 5 Drawing Sheets

DIFFERENTIAL STEERING MECHANISM

GOVERNMENT INTEREST

The invention described herein may by manufactured, used and licensed by or for the U.S. Goverment for governmental purposes without payment to me of any royalty thereon.

BACKGROUND AND SUMMARY

Tracked vehicles such as tanks or bulldozers are conventionally steered by moving the tracks on one side of the vehicle faster than the tracks on the other side of the vehicle. Such vehicles typically have steering systems which include various combinations of differential gears, clutches and brakes arranged so that the drive wheel for one track can be clutched or braked independently of the drive wheel for the other track. Such steering systems tend to add weight, space requirements and cost to the vehicles. Other tracked vehicles may have two separate drive trains connected to the vehicle engine, one drive train for each track. Having two drive trains also adds weight, space requirements and cost to the tracked vehicles.

In view of the above problems, what I propose is a differential gearbox style of steering mechanism that requires only one drive train component. My steering mechanism has an input gear for receiving power from the vehicle drive train and two output shafts, one for each drive wheel or track of the vehicle. Selectively actuatable bearing rings on the exterior of the differential gearbox interact with pinion gears that determine the amount of relative movement between the output shafts.

My steering mechanism can be part of a system that limits the speed differential between the output shafts. The speed differential between drive wheel or tracks of the vehicle are thus limited so that the vehicle has better traction on snow, mud or other slippery surfaces. Such a system includes sensors to detect the rotational speed of the output shafts and logic circuitry to compare the speeds. The logic circuitry sends signals to operate a means for actuating the bearing rings when the difference in speeds exceeds a selected limit. dr

DETAILED DESCRIPTION

Figure 1:
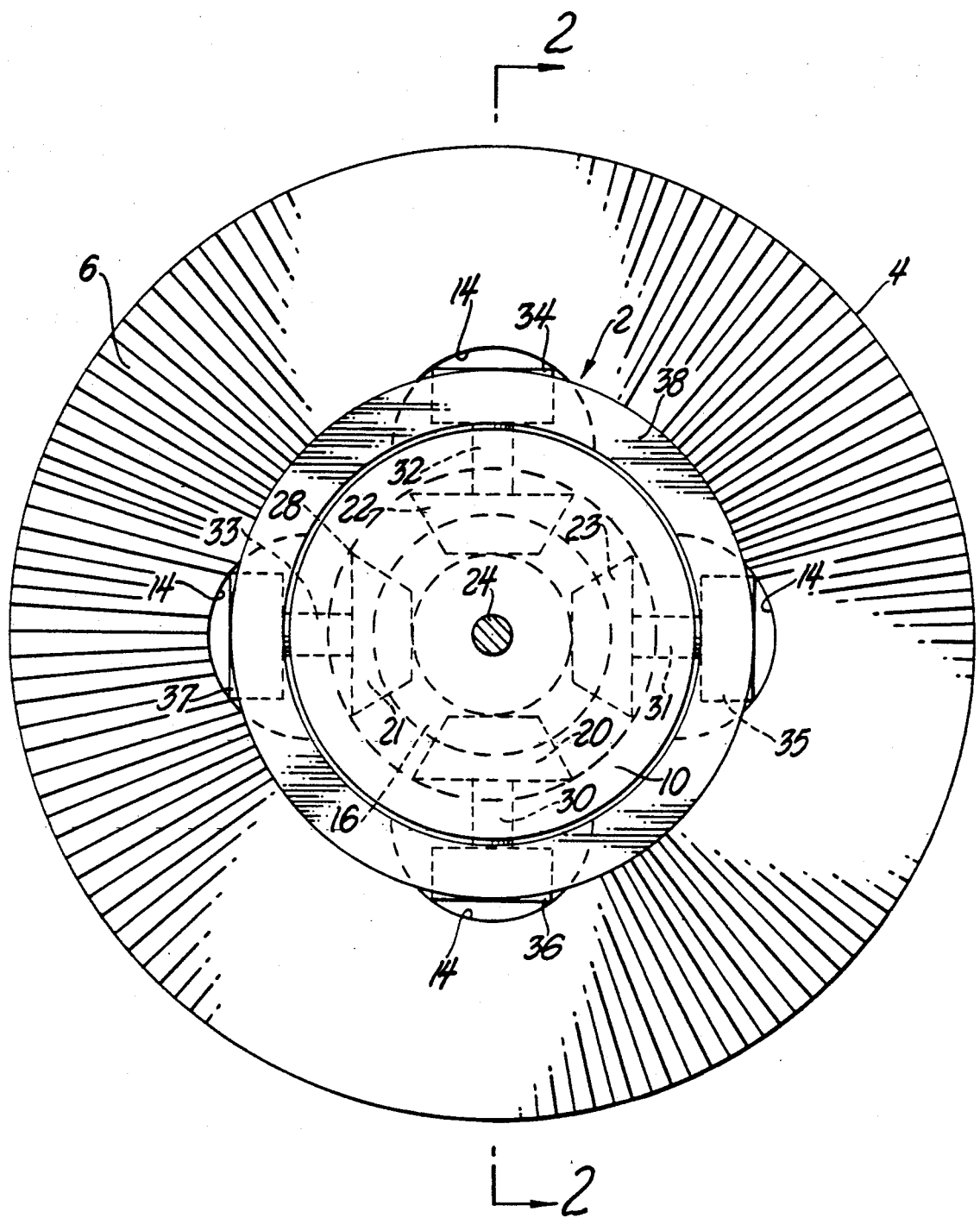
FIG. 1 is a side elevational view of my differential steering mechanism, the housing surrounding the mechanism being omitted for convenience.
Figure 2:
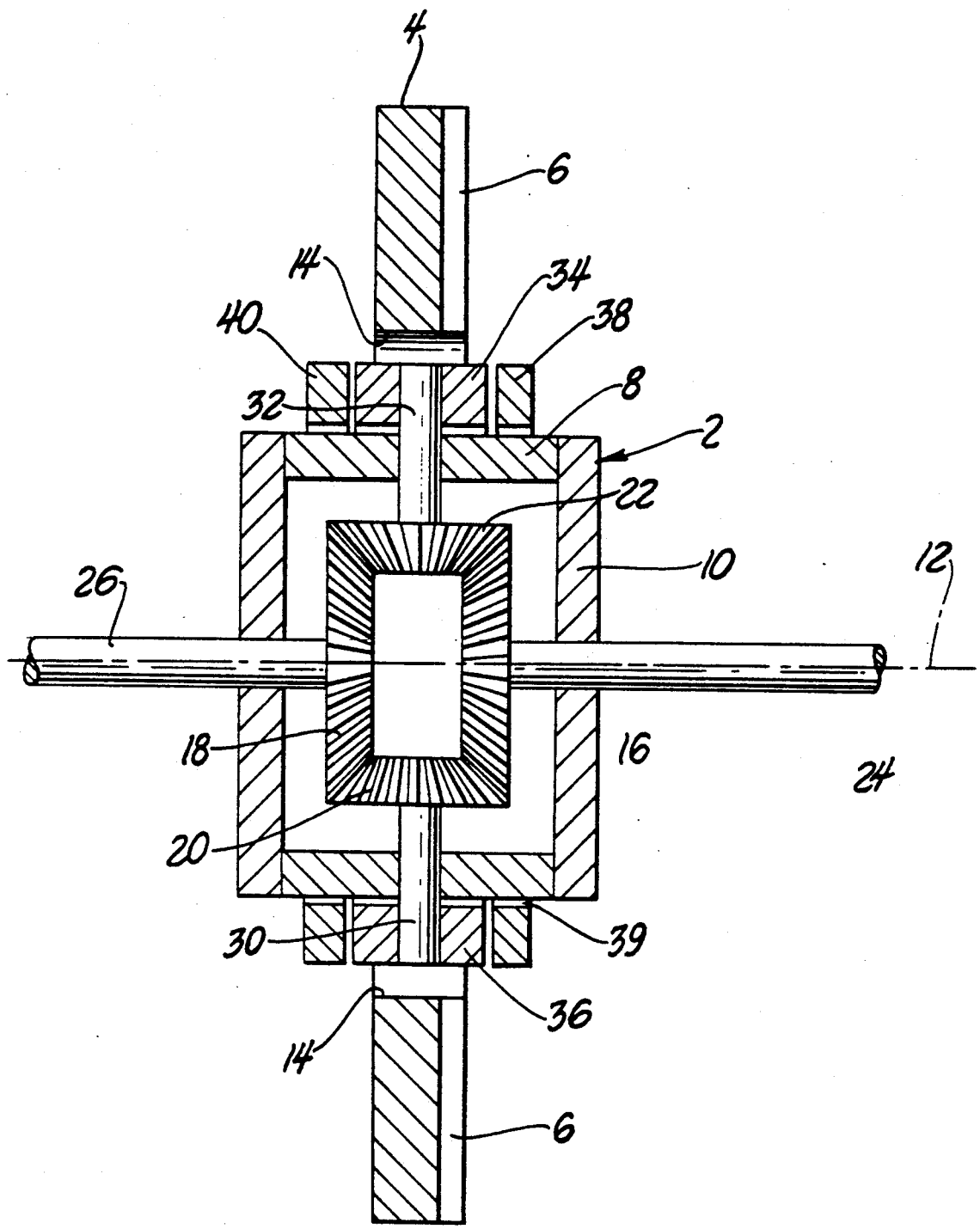
FIG. 2 is a view along line 2—2 in FIG. 1.

Shown in FIGS. 1 and 2 is a differential steering unit 2 having a cylindrical gearbox or housing element 8 to which is fixedly attached a power input gear 4. Gear 4 has teeth 6 for engaging a power train member connected by intermediate elements to a vehicle engine, the power train member, the intermediate elements and the engine being omitted from the drawings for convenience. Also omitted for convenience is the casing which would normally protect gear 4 and differential steering unit 2. Gear 4 has semicircular cut-outs 14 to accommodate pinion rotors 34, whose function will be described later. Gear 4 rotates about axis 12 and thereby causes differential steering unit 2 to rotate about axis 12 as well.

Fixed at the ends of housing element 8 are side or spider plates 10 so that housing element 8 becomes an enclosure to protect bevelled output gears 16 and 18 as well as bevelled pinion gears 20, 21, 22 and 23. Output gears 16 and 18 are fixed to respective output shafts 24 and 26 and rotates with the respective shafts about axis 12. It is contemplated that output from shafts 24 and 26 will ultimately drive the track of a track-laying vehicle such as a tank. It would also be possible for output from shafts 24 and 26 to be used to drive ground engaging wheels of a vehicle such as a truck.

Pinion gears 20, 21, 22 and 23 each mesh with both output gear 16 and output gear 18 and each pinion gear engages the inner peripheral surface of housing element 8. Although the pinion gears are shown as having sharp corners to engage the inner peripheral wall of housing element 8, as at 28 (FIG. 1), these corners can be rounded to conform with the curvature of the inner peripheral wall so as to form a bearing surface for smooth, sliding engagement with the inner peripheral wall. In addition or in the alternative, the inner peripheral wall can be provided with circular or semicircular grooves to accommodate and slidingly receive the pinion gears.

Pinion gears 20, 21, 22 and 23 are fixed to respective pinion shafts 30, 31, 32 and 33, the pinion shafts extending radially with respect to axis 12 through housing element 8. At the radially outward ends of the pinion shafts are rotors 34, 35, 36 and 37 which are rotatably fixed onto their respective pinion shafts 30, 31, 32, and 33. FIGS. 1 and 2 show a slight radial clearance as at 39 between the outer peripheral surface of housing element 8 and the rotors, but it may be preferred that there be no such clearance so that the rotors bear slidingly upon housing element 8. In the alternative, a bushing may be placed in the clearance at 39. The absence of a clearance at 39 prevents radial play of assemblies comprised of the rotors, pinion shafts, and pinion gears.

Concentric with and surrounding cylindrical housing elements 8 are annular bearing rings 38 and 40, which are translatable along axis 12. The clutches are axially translated by reciprocatable members 60 of clutch actuator mechanisms 58, which are shown semi-schematically FIG. 3. The clutch actuator mechanism is fixed relative to the vehicle in which steering gears assembly 2 is installed and is preferably anchored to a protective casing (not shown) which encloses steering unit 2.

When the vehicle where steering unit 2 is installed is travelling, power input gear 4 rotates unit 2 and thereby rotates output shafts 24 and 26 about axis 12. When the vehicle travels in a straight path, neither bearing ring 38 nor bearing ring 40 engages any of the rotors 34, 35, 36 or 37. Consequently, none of the rotors turns on its own axis and therefore the rotors do not cause a speed differential between output shafts 24 and 26. When it is desired to steer the vehicle in one direction, bearing ring 38 is forced into engagement with the rotors by the appropriate pair of actuators 58. Since the rotors are orbiting about axis 12 and bearing ring 38 is rotationally stationary with respect to axis 12, the rotors will roll against bearing ring 38. This rolling of the rotors causes the pinion gears to rotate output shaft 24 relative to output shaft 26 so that one side of the vehicle moves faster than the other side and the vehicle changes direction. When it is desired to steer the vehicle in the opposite direction, bearing ring 40 rather than bearing ring 38 is engaged with the rotors.

It can be seen from FIG. 2 that when the rotors roll against one of the bearing rings, the sides of rotors more remote from axis 12 must attempt to rotate faster than the sides of the rotors more proximal to axis 12. There necessarily must be slippage between the respective bearing surfaces of the rotors and bearing rings, which slippage creates a greater tendency for wear between the rotors and the bearings rings. Given a relatively narrow radial width of the bearing rings and rotors relative to axis 12, the slippage will be inconsequential for many applications. However, for other applications, it is believed that the FIG. 4 embodiment of my invention may be preferable.

Figure 4:
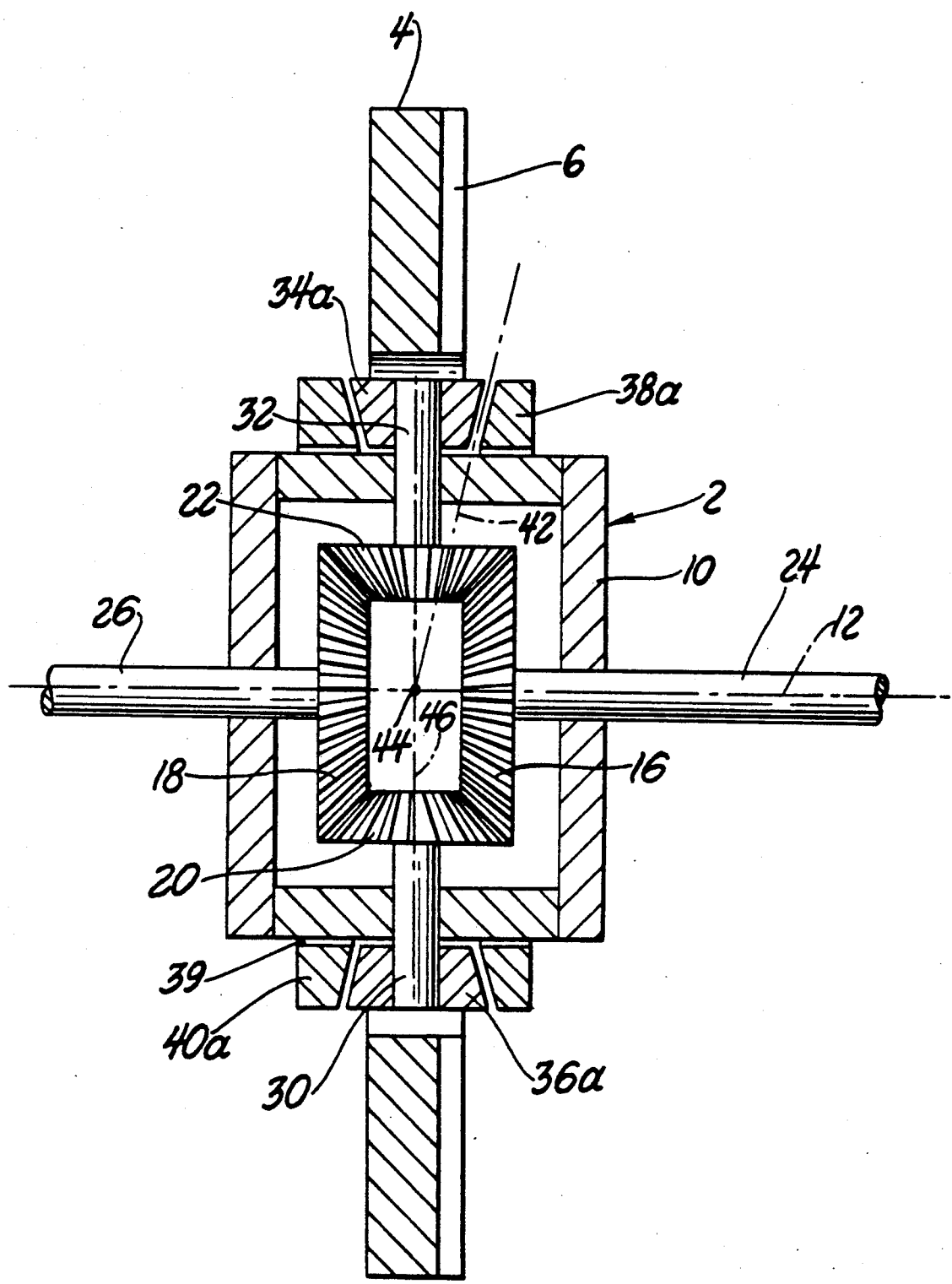
FIG. 4 is an alternate embodiment of the differential mechanism shown in FIG. 2.

The FIG. 4 embodiment is the same as the FIG. 2 embodiment except that the FIG. 4 embodiment has bevelled rotors as shown at 34a and 36a, and has complimentarily bevelled bearing rings as shown at 38a and 40a. The line of contact between a rotor and an associated bearing ring will lie along an imaginary line such as that shown at 42. Line 42 radiates from a point 44 located at the intersection of axis 12 and the common axis 46 about which rotors 34a and 36a roll when contacted by bearing ring 38a or 40a. Point 44 lies midway between output gear 16 and output gear 18. Because of the particular orientation of the bevelled surfaces of the rotors and bearing rings in the FIG. 4 embodiment, there will be no slippage between the rotors and bearig rings.

Figure 5:
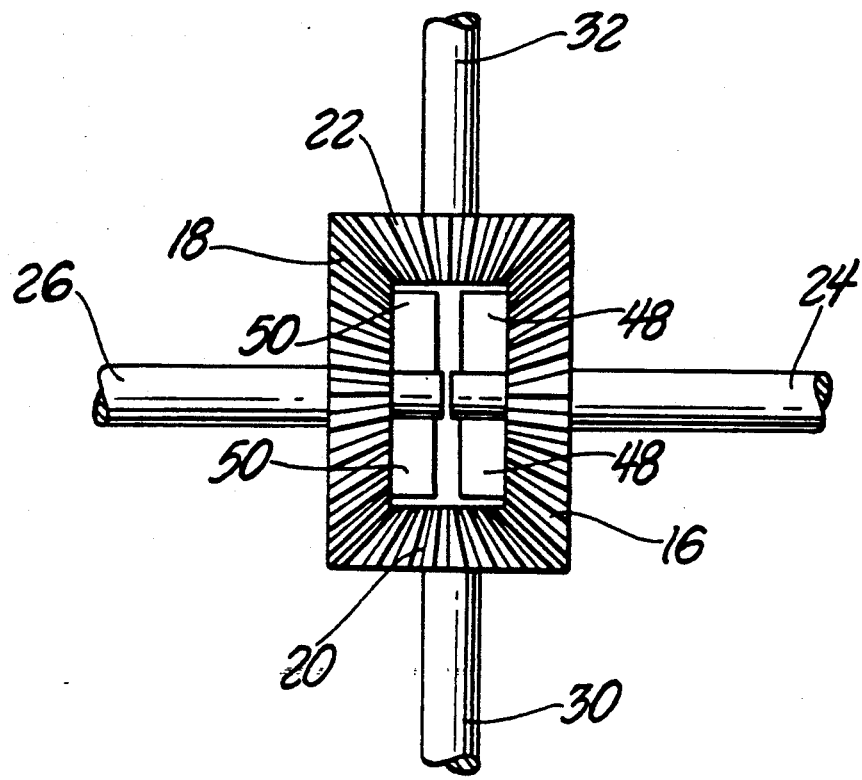
FIGS. 5 and 6 show an alternate embodiment of the output bevel gears shown in FIGS. 2 and 4.
Figure 6:
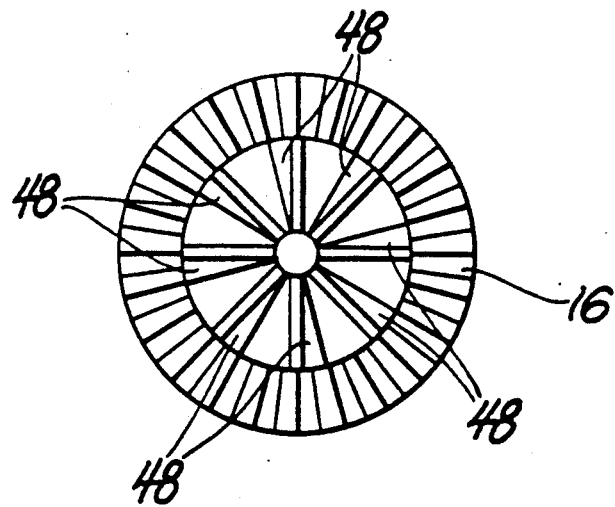

Another possible modification to my invention can be seen in FIGS. 5 and 6, which depict the addition of vanes or blades 48 and 50 to respective output gears 16 and 18. It is contemplated that the FIG. 5 assembly will be immersed in a relatively viscous fluid retained in the enclosure defined by housing element 8 and spider plates 10. It is contemplated that the fluid will have a viscosity of between 20 and 70 centipoise at 20 degrees Centigrade. If gear 16 rotates faster than gear 18, blades 48 will drive the fluid against blades 50 on gear 18. Blades 50 will be angled so that gear 26 will tend to be rotationally accelerated in the angular direction of gear 16. If the speed of gear 16 relative to gear 18 increases, then the tendency of gear 18 to be accelerated in the direction of gear 16 also increases. In similar fashion, if the speed of gear 18 increases relative to gear 16, then the tendency of gear 16 to be accelerated in the direction of gear 18 also increases. The resulting inhibition of speed differential between output shafts will be useful, for example, when both drive wheels of a vehicle are on a low traction surface such as mud or snow.

Figure 3:
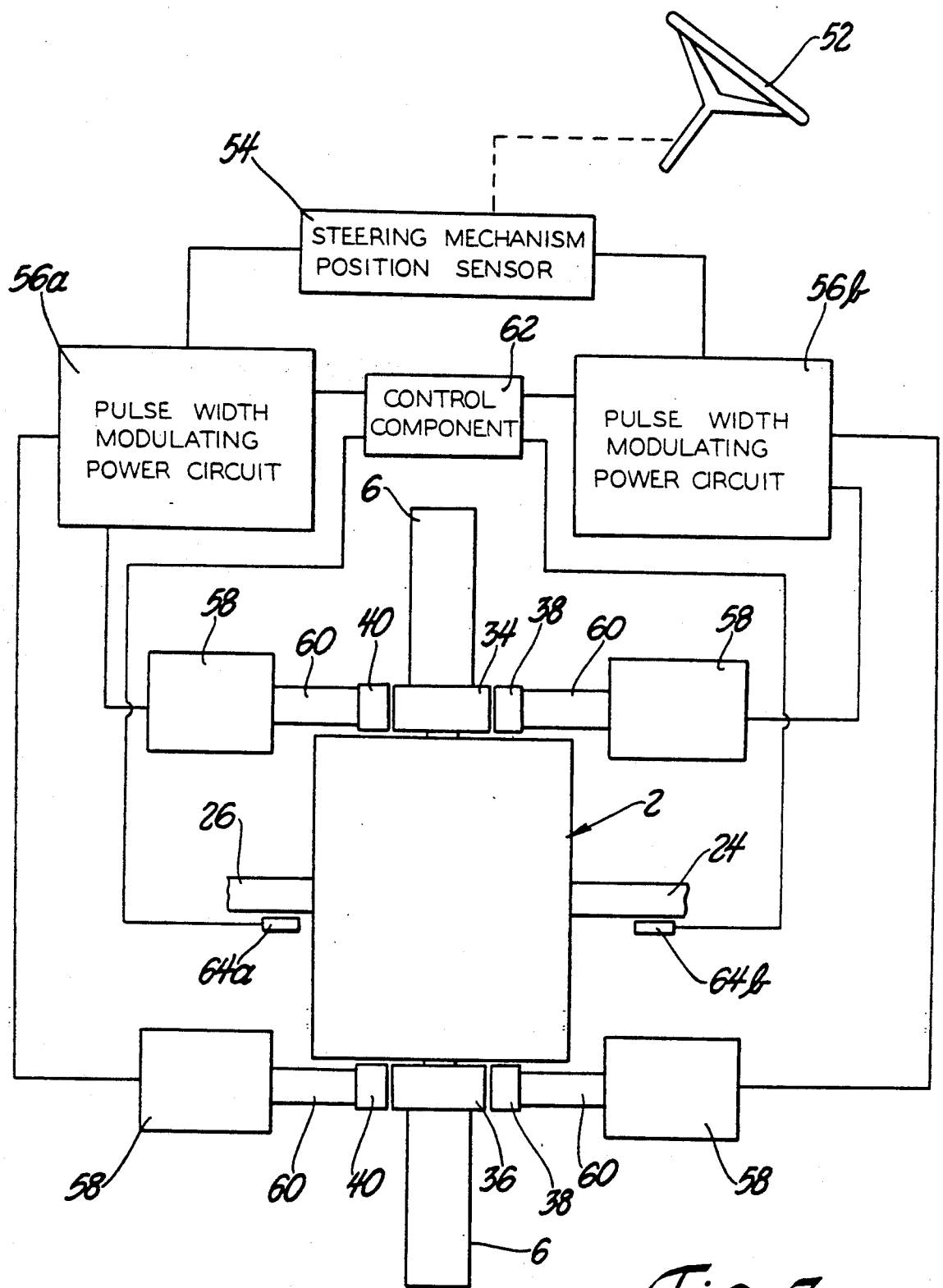
FIG. 3 is a semi-schematic view of a steering system incorporating my differential steering mechanism.

FIG. 3 is a semi-schematic diagram of a system into which my differential steering mechanism can be incorporated. At 52 is shown a manual steering input member such as a conventional driver's steering wheel or a joy stick, there being a suitable steering mechanism position sensor 54 mounted at or on steering input member 52. Position sensor 54 sends signals representative of the input member's position to pulse width modulating power circuits 56a and 56b. Circuit 56a and 56b energize or de-energize actuators 58 in response to the signals from position sensor 54. When it is energized, and actuator 58 effects translation of reciprocatable members 60 toward a selected one of bearing rings 38 or 40, so that the selected bearing ring is forced against rotors 34, 35, 36 and 37.

In operation, the vehicle driver will manipulate steering input member 52 to turn the vehicle to the right or left. Power circuit 56b is programmed to send electric power pulses to the associated actuator 58 upon receiving any signal from sensor 54 indicative of a right turn, but circuit 56b will send no power pulses upon receiving signal indicative of a left turn or straight movement of the vehicle. In complimentary fashion, power circuit 56a is programmed to send electric power pulses to the associated actuator 58 upon receiving any signal form sensor 54 indicative of a left turn, but circuit 56a will send no power pulses upon receiving signal indicative of a right turn or straight movement of the vehicle. As the angle of vehicle turn increases, position sensor 54 varies its signal. The appropriate power circuit will respond to the variation in the position sensor signal by increasing the length of the power pulses, decreasing the time between power pulses or a combination of these actions. If the vehicle is being turned left, for example, power circuit 56b will send power pulses to its associated actuators 58 whose translatable members 60 will force bearing ring 38 against the rotors. It is preferred that the bearing rings and reciprocatable members 60 be biased away from the rotors so that the bearing rings do not engage the rotors unless the appropriate actuators 58 are energized.

Optionally, the steering system shown in FIG. 3 may include a control component 62 which receives signals from rotational speed sensors 64a and 64b. Sensors 64a and 64b are mounted on or at respective output shafts 26 and 24 and send signals to control component 62 representative of the rotational speeds of these shafts. Control component 62 also receives signals from sensor 54 indicative of the position of steering mechanism 52 and can send control signals to power circuits 56a and 56b so as to govern the engagement of bearing rings 38 and 40 with the rotors. Control component 62 compares the rotational speed signals from sensors 64a and 64b and derives a value for the speed differential between shafts 26 and 24. At a preselected speed differential, component 62 sends control signals to both power circuit 56a and 56b, whereupon both bearing rings 38 and 40 will engage the rotors so as to inhibit further relative movement between shafts 26 and 24. The preselected speed differential will vary as a function of steering angle, the preselected speed differential generally increasing with an increasing steering angle of the vehicle. Control component 62 can be programmed to calculate or chose from a look-up table a particular preselected speed differential based on the signal that control component 62 receives from position sensor 54.

I wish it to be understood that I do not desire to be limited to the exact details of construction shown and described herein since obvious modifications will occur to those skilled in the relevant arts without departing from the spirit and scope of the following claims.

What is claimed is:

1. A mechanism for delivering a higher speed rotational power output to one drive train member than to another drive train member, the mechanism comprising:
   a cylindrical body having a first rotational axis;
   a power input gear fixed to the cylindrical body;
   output shafts extending along the first rotational axis from cylindrical body, the output shafts rotatable about the first rotational axis;
   one output gear attached to one of the output shafts and another output gear attached to the other of the output shafts;

a pinion gear meshing with both the one output gear and the other output gear;

a pinion shaft fixed to the pinion gear;

a rotor outside the cylindrical body attached to the pinion shaft;

bearing rings positioned on the cylindrical body;

selectively actuatable means for forcing one of the bearing rings into engagement with the rotor.

2. A mechanism for steering a vehicle by delivering a higher speed rotational power output to a tractive drive on one side of the vehicle than to a tractive drive on the opposite side of the vehicle, the mechanism comprising:

a cylindrical body having a first rotational axis;

ends of the cylindrical body forming an enclosure with the cylindrical body;

a generally annular power input gear fixed concentrically to the cylindrical body;

an output shaft extending from either end of the cylindrical body along the first rotational axis, the output shafts rotatable about the first rotatioal axis;

one output bevel gear in the cylindrical body attached to one of the output shafts and another output bevel gear in the cylindrical body attached to the other of the output shafts;

a pinion bevel gear meshing with both the one output bevel gear and the other output bevel gear;

a pinion shaft fixed to the pinion bevel gear, the pinion shaft extending radially away from the first rotational axis;

a rotor on the outer peripheral surface of the cylindrical body, the rotor being attached to and concentric with the pinion shaft;

a pair of annular bearing rings conventrically encircling the cylindrical body such that the rotor is between the bearing rings, the bearing rings being translatable along the first rotational axis;

selectively actuatable means for forcing at least one of the bearing rings into engagement with the rotor.

3. The mechanism of claim 2 further including a biasing means for disengaging the bearing rings from the rotor when the selectively actuatable means is not actuated.

4. The mechanism of claim 2 wherein the bearing rings have rotor engaging surfaces and the rotor has a bearing ring engaging surface, the engaging surfaces disposed so that during contact between one of the bearing rings and the rotor there will be an area of contact between the engaging surfaces that lies along a line radiating from a point on the first rotational axis midway between the bevel output gears.

5. The mechanism of claim 2 wherein:

the cylindrical body is filled with a liquid;

the one bevel output gear has a surface faced toward the other bevel output gear, the respective surfaces having blade-like vanes thereon;

the vanes oriented so that when the one bevel output gear rotates in a given direction relative to the other output level gear, the other output gear tends to be accelerated in the given direction.

6. A system for steering a vehicle by delivering a high speed rotational power output to a tractive drive on one side of the vehicle than to another tractive drive on the opposite side of the vehicle, the system comprising:

a cylindrical body having a first rotational axis;

a power input gear fixed concentrically to the cylindrical body;

rotatable output shafts extending from cylindrical body, the output shafts being concentric with the first rotational axis;

one output gear in the cylindrical body attached to one of the output shafts and another output gear in the cylindrical housing attached to the other of the output shafts;

a pinion gear meshing with both the one output gear and the other output gear;

a pinion shaft fixed to the pinion gear;

a rotor on the outer peripheral surface of the cylindrical body, the rotor being attached to the pinion shaft;

a pair of bearing rings encircling the cylindrical body such that the rotor is between the bearing rings, the bearing rings being translatable along the first rotational axis;

an input member for manually selecting the steering angle of a vehicle;

an input position sensor for detecting the position of the input member, the input sensor producing position signals representative of the steering angle of the vehicle in response to the sensed position of the manual input member;

a controllable power circuit which receives the position signals and whose power output is controlled by the position signals;

an bearing ring actuator for forcing one of the bearing rings against the rotors in response to power output from the controllable power circuit.

7. The system o claim 6 further including:

a second power circuit which receives the position signals and whose power output is controlled by the position signals;

a second bearing ring actuator for forcing the other bearing ring against the rotors in response to power output from the second power circuit;

a rotational speed sensor positioned at each of the output shafts, the speed sensors sending speed signals representative of the rotational speed of the output shafts;

a control component receiving the speed signals from the speed sensors and determining a value for the rotational speed differential between the output shafts, the control component sending an activation signal to both power circuits when the differential exceeds a predetermined limit, the power circuits reacting to the activation signals by sending power output to the actuators, whereby both bearing rings engage the rotor.

8. The system of claim 7 wherein the control component receives the position signals from the position sensor and varies the predetermined limit in accordance with changes in the position signals.

* * * * *